United States Patent [19]

Emmons et al.

[11] 4,425,469

[45] Jan. 10, 1984

[54] POLYACRYLAMIDE FLOW MODIFIER-ADSORBER

[75] Inventors: William D. Emmons, Huntingdon Valley; Travis E. Stevens, Ambler, both of Pa.

[73] Assignee: Rohm and Haas Company, Philadelphia, Pa.

[21] Appl. No.: 185,080

[22] Filed: Sep. 8, 1980

[51] Int. Cl.³ .................... C08F 2/16; C08F 120/56
[52] U.S. Cl. ................ 524/750; 427/385.5; 427/393; 427/393.5; 524/389; 524/555; 524/767; 526/212; 526/214; 526/224; 526/303.1
[58] Field of Search ............ 260/29.6 RW, 29.6 WB, 260/29.6 H, 29.6 TA; 526/224, 214, 303.1, 85, 212, 227; 524/827, 750, 767; 427/385.5, 393.5, 393; 428/518, 522, 500, 523, 519, 520; 252/357; 106/20, 23

[56] References Cited

U.S. PATENT DOCUMENTS

| 3,219,588 | 11/1965 | La Combe et al. | 526/224 X |
|---|---|---|---|
| 3,498,943 | 3/1971 | Dannals | 260/29.6 |
| 3,627,820 | 12/1971 | Chujo | 260/486 |
| 3,632,466 | 1/1972 | Peaker | 161/67 |
| 3,755,278 | 8/1973 | Patron et al. | 526/224 X |
| 3,959,224 | 5/1976 | Coleman | 526/224 X |
| 3,960,824 | 10/1976 | Hicks | 526/85 |
| 3,963,684 | 6/1976 | Evani | 526/303 |
| 4,151,144 | 4/1979 | Dyson | 260/29.6 |

FOREIGN PATENT DOCUMENTS 2458741  6/1976  Fed. Rep. of Germany ...... 526/224

*Primary Examiner*—Thurman K. Page
*Attorney, Agent, or Firm*—Harold L. Greenwald; Michael B. Fein; W. E. Ross Scott

[57] ABSTRACT

A water soluble, vinyl addition polymer of acrylamide comprising a hydrophobic terminal group is useful as an adsorbate and as a flow modifier in aqueous systems. The polymer is particularly useful as a thickening agent or rheology modifier for water based multiphase systems, a block improvement additive in water based coatings formulations, a stabilizer for aqueous emulsions (including polymer emulsions), a transfer aid in water based ink or roll coater formulations, a surfactant and a dispersant. The disclosure also comprises a solution polymerization method of preparing the polymer.

22 Claims, No Drawings

POLYACRYLAMIDE FLOW MODIFIER-ADSORBER

BACKGROUND OF THE INVENTION

This invention relates to a flow modifier for aqueous systems which is also an effective adsorbate onto solids from aqueous systems. The modifier is a homopolymer or copolymer of acrylamide polymerized by a process employing an initiator or a chain transfer agent at least one of which comprises a hydrophobic group of an effective size. It is believed that the acrylamide polymer bears the hydrophobic group, probably as its terminal group or groups. Aqueous solutions of such a polyacrylamide have higher viscosities than aqueous solutions of polyacrylamide of similar molecular weight made by a process which does not entail hydrophobic groups, when measured at concentrations such as 0.1% or more. Multiphase compositions, comprising a continuous aqueous phase and at least one other phase, containing the polyacrylamide flow modifier have a surprising combination of desirable properties in a number of uses. Typical of these uses are paint and printing ink modification, emulsion stabilization, and pigment dispersion.

High molecular weight polyacrylamide and partially hydrolyzed derivatives thereof have long been known as thickeners for water and in various other uses as reported in "Handbook of Water Soluble Gums and Resins" R. L. Davidson, Ed., McGraw Hill 1980, Chapter 16 by Volk and Friedrich. Processes for preparing polyacrylamide are old in the art; Minsk et al., U.S. Pat. No. 2,486,191, teach solution polymerization in aqueous alcohol solution, Monagle et al., U.S. Pat. Nos. 3,336,269, 3,336,270 and 3,509,113, teach a precipitation process employing tertiary butanol, and optionally acetone, in water as the polymerization medium. Mercaptans are well known free radical polymerization modifiers and chain transfer agents and are so employed by Uraneck et al., U.S. Pat. No. 2,888,442, and O'Brien, U.S. Pat. No. 3,028,367.

Mercaptans as components of initiators for acrylamide polymerizations are taught by Chujo, U.S. Pat. No. 3,627,820, and Hicks, U.S. Pat. No. 3,960,824. Hicks teaches the preparation of the low molecular weight polymers, of monomers including acrylamide, by a bulk polymerization process using organic mercaptans, at about 0.01 to 0.3 equivalents per mole of monomer, in the presence of oxygen. The polymers are typically viscous liquids and tacky solids and may be used as plasticizers or components of 100% solids coatings and molding compositions. Chujo teaches a process for polymerizing monomers, including acrylamide, in the presence of a catalyst composition consisting of a complex compound of acetyl acetone with trivalent manganese and a mercaptan. Chujo's process and polymers produced thereby are discussed further below.

The course of a free radical polymerization is believed to entail the following principal reaction steps, where a "°" indicates the unshared electron of a free radical:

| | |
|---|---|
| I → R° | Initiator I decomposes |
| R° + M → RM$_1$° | Initiation of Monomer M |
| RM$_1$° + M → RM$_2$° | Propagation |
| RM$_n$° + M → RM$_{(n+1)}$° | Step n + 1 |
| RM$_n$° + RM$_m$° → RM$_{(n+m)}$R | (combination) Termination |

-continued

| | |
|---|---|
| RM$_n$° + RM$_m$° → RM$_n$H + RM$_m$(−H) | (disproportionation) |

Molecular weight of the polymer depends on the relative rates of initiation, propagation and termination. Termination is by: (1) combination, i.e., two radicals combining, (2) disproportionation, i.e. one radical abstracting a hydrogen atom from another to result in one saturated and one unsaturated molecule, often unreactive, or (3) transfer of the free radical to some other species present:

| | |
|---|---|
| RM$_n$° + M → RM$_n$ + M$_1$° | With monomer |
| RM$_n$° + RM$_m$ → RM$_n$ + RM$_m$° | With dead polymer |
| RM$_n$° + S → RM$_n$ + S° | With solvent or chain transfer agent S |

The S° then becomes an initiating radical to produce polymer molecules such as SM$_n$, SM$_{(n+m)}$S and SM$_{(n+m)}$R.

Some of the products of transfer may be unreactive radicals. Use of chain transfer to limit molecular weight is old, commonly employing mercaptans, secondary alcohols or other molecules with an easily abstracted H atom. An initiator fragment and a chain transfer fragment are thus the end groups of many or all of the polymer molecules.

It is believed that the polyacrylamide of the instant invention comprises one or more terminal alkylmercapto groups wherein the alkyl group is of a size large enough to tend to drive the polyacrylamide out of water solution, i.e. be effective hydrophobes. This tendency is believed to be energetically favored by the formation of water-water secondary bonds made possible if the alkyl groups associate. This tendency may be responsible for many of the unusual and unexpected properties of the polyacrylamides of the instant invention and their aqueous solutions. Among these properties is the surprising increase in viscosity of an aqueous solution as the concentration of the polymer is increased as compared to a polymer employing a less water insoluble mercaptan chain transfer agent or polymerization modifier. Similarly, unusual behavior is found in the rheological properties of emulsions, suspensions and other multiphase systems, such as those containing both liquid and solid phases (mixed emulsions and suspensions), comprising this polyacrylamide. Further novel effects are noted when systems containing the polyacrylamide of the instant invention are dried and ease of bonding to the exposed surface is determined. It is seen that bonding is poor, especially the bonding between two coated surfaces (i.e., so-called "blocking") and it is concluded that these polyacrylamides are surprisingly adhesion-inhibiting adsorbates. The thickeners or flow modifiers of the invention are exceptionally versatile in their ability to impart special rheological properties to aqueous solutions and to multiphase solutions comprising an aqueous continuous phase. They are relatively efficient viscosity improvers at comparatively low molecular weights and at the same time provide improved rheological properties to aqueous solutions and systems subjected to high or low shear rate. An example of these improvements is found in latex paints containing the modifiers of this invention formulated so as to provide, in a single paint formulation, superior flow and leveling, and desired viscosity values under both low shear and high shear conditions as well as result in coatings having high gloss, and resistance to blocking.

Water soluble thickeners are notoriously difficult to handle in industrial processes because when furnished as solids they take inordinately long times to dissolve, or when furnished as concentrated solutions they are difficult to dilute uniformly so as to avoid the production of local areas of high concentration, often known as "fisheyes" because of their appearance. Both in simple aqueous solution and, more particularly, in formulations comprising other phases, extended agitation and aging periods are required before an equilibrium viscosity is attained. This requires formulators to guess or develop rule of thumb methods for estimating the final equilibrium rheological properties of the formulation or to inventory large amounts of product and reprocess it if the final rheological properties do not meet an established specification. One of the advantages of the polyacrylamides of this invention is the rapidity with which equilibrium rheological properties are attained. This rapid equilibration may be due to the relatively high viscosity of the aqueous solutions, with respect to the molecular weight of the polyacrylamide, exhibited by the water solutions having concentrations in excess of 0.1%. Thus one may regard the aqueous solutions as having a viscosity to be expected of high molecular weight polyacrylamides while, at the same time, insofar as diffusional characteristics, such as concentration equilibration rate, are concerned, the polyacrylamide behaves as though the molecular weight is comparatively low. This is both a surprising property and one of great importance in the manufacture of multiphase systems.

The rapid equilibration, in the distribution in solution, of the polyacrylamides of this invention may be considered to be associated with the unusual rheological properties of systems thickened thereby. Without being bound by the theories expressed or implied, the following remarks are offered as an aid in the teaching of this invention. The introduction of thickener polymers into a solution is thought to promote a specific structure in the solution phase or an interaction among phases resulting in a structure. If the structure is resistant to change, throughout a broad range of shear rates, then its rheology profile is Newtonian, that is, its apparent viscosity is relatively independent of shear rate. If the structure is not shear resistant, but degrades under shear and does not reform as fast as the degradation, then its rheological profile will be less Newtonian and more pseudoplastic. A water soluble high molecular weight polymer added to an aqueous phase readily gives an increased viscosity as measured to a given low shear rate. However, as the shear rate is increased, it is commonly observed that the viscosity diminishes, that is, the solution appears to have pseudoplastic rheology. This may be due to the original structure not being maintained because the high molecular weight polymer molecules do not permit rapid equilibration of their distribution in the solution. Because of the unexpectedly high rate of equilibration, the thickeners of this invention exhibit a more nearly Newtonian rheology then do current commercial thickeners, even at high shear rates.

The nonionic polyacrylamides of this invention have outstanding tolerance for electrolytes in the sense that the rheology properties of their aqueous solutions are comparatively insensitive to electrolytes as well as to changes in pH. The viscosity of aqueous solutions thickened by these polyacrylamides is less sensitive to shear than solutions of the same viscosity thickened by prior art materials.

The acrylamide polymers prepared with hydrophobe containing chain transfer agents and optionally hydrophobe containing initiators function as thickeners and rheology modifiers in aqueous systems at concentrations greater than about 0.1% in water. Formulated with a wide variety of aqueous systems comprising small particles, such as latexes, these polymers afford multiphase systems of great commercial interest such as paints, printing inks and other systems comprising a thickened aqueous phase. An example of such materials are gloss paints which are found to have an excellent balance of low shear and high shear viscosity, exceptional flow, leveling and film build and which produce resulting paint films having high gloss, block resistance, and, when compared to formulations comprising conventional nonionic thickeners such as hydroxyethyl cellulose or anionic thickeners, have better alkali and abrasion resistance and resistance to degradation such as by shearing or by enzymes. In general, the polyacrylamides of the instant invention are also effective sedimentation stabilizers, surfactants, and dispersants.

BRIEF DESCRIPTION OF INVENTION

The composition of this invention is an aqueous solution of a water soluble, vinyl addition polymer of acrylamide and 0 to 50% by weight of at least one other vinyl monomer, having the improvement wherein the polymer is a product of a process employing a free radical initiator and a chain transfer agent which initiator or agent is substantially water insoluble and comprises an effective hydrophobe group. In a further embodiment, this invention is concerned with a multiphase composition comprising an aqueous phase and at least one other phase, wherein the multiphase composition comprises the water-soluble, vinyl addition polymer of acrylamide. A novel method of preparing the polymer of acrylamide is by solution polymerization employing a substantially water insoluble molecule having an effective hydrophobe group as an initiator or transfer agent or a component of either the initiator or transfer agent.

DETAILED DESCRIPTION

The polyacrylamide of this invention is a free radical initiated homopolymer or copolymer of acrylamide polymerized in the presence of a free radical initiator and a chain transfer agent, preferably prepared by solution polymerization. The initiator or the chain transfer agent, preferably the latter, is substantially water insoluble and comprises an effective hydrophobe group. An effective hydrophobe group is one resulting in the aqueous solution of polyacrylamide having an unusually high viscosity at a given solution concentration and polyacrylamide molecular weight. The hydrophobe group is preferably a hydrocarbyl group comprising at least 8 carbon atoms preferably between 10 and 36 carbon atoms, more preferably between 12 and 22 carbon atoms such as in lauryl, t-dodecyl, n-tetradecyl, n-hexadecyl, and n-octadecyl mercaptans. Substantially water insoluble, in this context, means having a low solubility in water, preferably less than 0.1% and more preferably less than 0.01% and most preferably less than 0.001% by weight.

The polymer is preferably a homopolymer of acrylamide. In other embodiments it is a copolymer of acrylamide and other vinyl monomers preferably hydroxyethyl methacrylate, hydroxyethyl acrylate, styrene, vinyltoluene, methacrylic acid, acrylic acid, and N-vinylpyrrolidone. Ionic acrylamide copolymers are made by copolymerization with ionizable monomers, preferably methacrylic acid and acrylic acid. Nonionic copolymers are prepared employing the hydroxyalkyl acrylates or methacrylates or hydroxy-, alkoxy-, or polyalkoxyalkyl acrylates and methacrylates, the preferred alkyl groups in these compounds having 2 to 4 carbon atoms and most preferably 2 or 3, i.e., being ethoxy or propoxy materials.

The weight average molecular weight of the polyacrylamide is greater than 10,000 to insure appropriate thickening ability. A preferred molecular weight range is from 50,000 to 1 million with the range 80,000 to 200,000 being most preferred and particularly leading to a shear stable effective thickener for aqueous solutions and multiphase systems containing a continuous aqueous phase.

The free radical polymerization is preferably conducted in an atmosphere substantially free of oxygen and employs a free radical initiator at the usual levels such as between 0.05 and 20 milliequivalents per 100 grams (me/100 g) monomer. The chain transfer agent may be employed over a wide range of concentrations with 0.05 to 20 me/100 g monomer being preferred and 0.5 to 5 being more preferred.

Acrylamide homopolymers with molecular weights of 10,000 to 1,000,000 are preferred compositions. However, other hydrophilic monomers, preferably water-soluble, can be substituted for acrylamide, at up to 50%, preferably up to 30%, most preferably 20%, for the purposes of this invention.

Among the hydrophilic monomers which can be used are acrylonitrile, methacrylonitrile, hydroxy-substituted alkyl and aryl acrylates and methacrylates, polyether acrylates and methacrylates, alkyl-phosphato-alkyl acrylates and methacrylates, alkyl-phosphono-alkyl acrylates and methacrylates, acrylic acid, methacrylic acid, maleic acid, maleic anhydride, N-vinylpyrrolidone, alkyl and substituted alkyl amides of acrylic acid, methacrylic acid, maleic acid (mono- and di-amides), fumaric acid (mono- and di-amides), and itaconic acid (mono- and di-amides), methacrylamide, also other half acid forms of the above dibasic acids such as half esters, alkyl vinyl ethers, such as butyl vinyl ether, amino monomers such as amino-substituted alkyl acrylates and methacrylates, vinylpyridines and aminoalkyl vinyl ethers, and ureido monomers, including those with cyclic ureido groups, and the like. Many others will occur to those skilled in the art, and the scope of the present invention should be interpreted to include such hydrophilic monomers generally. The proper scope of the invention should also be interpreted to include variations on the inclusion of the hydrophilic monomer, such as, for example, when a monomer is included in the polymerization mix which is not itself hydrophilic, but is altered in processing or in a subsequent step, e.g., by hydrolysis or the like, to provide hydrophilicity; anhydride- and epoxide-containing monomers are examples.

Among the effective hydrophilic monomers, it is preferred to utilize acrylic compounds, particularly the hydroxy alkyl esters of acrylic acid. Amides and hydroxy alkyl esters of methacrylic and other acids are also preferred, the methacrylates and acrylates, which are more readily polymerized are most preferred. Monomers containing carboxylic acid group(s) are also preferred, particularly acrylic acid, methacrylic acid and itaconic acid. Another preferred group of hydrophilic monomers are those representing specific examples of potential hydrophilic monomers which produce the actual hydrophilic mer units in the polymer by a hydrolysis process, which need not be complete. These monomers are the esters of vinyl alcohol such as vinyl formate, vinyl acetate, vinyl propionate, vinyl butyrate, and vinyl versatate. Hydrolysis of these monomers produces vinyl alcohol mer units in the polymer which mer units are hydrophilic. The preferred monomer of these is vinyl acetate.

It is preferred that the hydrophilic monomer be water soluble to the extent of at least 1% more preferably at least 5% and most preferably at least 50%. It is also preferred that the hydrophilic monomer be free of large hydrocarbyl groups such as those having 8 or more carbon atoms and more preferably those having 6 or more carbon atoms since these groups contribute hydrophobicity.

Another preferred embodiment comprises polymers of low levels, preferably less than 10%, more preferably less than 5% or even 2%, of small hydrophobic monomers such as styrene, vinyltoluene, alpha methylstyrene, esters of alpha, beta-ethylenically unsaturated acids and C1–C6 alcohols (except those of high solubility in water which are thus properly classified as hydrophilic, examples being methyl and ethyl acrylate and methacrylate), vinyl chloride, chlorostyrene, vinyl acetate, butadiene, chloroprene, isobutene, isoprene, ethylene, propylene, esters of vinyl alcohol and C1 to C5 acids. Such small hydrophobic monomers have fewer than 9C atoms or, after polymerization produce new units with pendant groups of fewer than 8C atoms.

The desired introduction of a hydrophobe at a terminus of the polymer chain can be effected with a hydrophobe-containing initiator, a hydrophobe-containing chain transfer agent, or some combination of initiator and chain transfer agent. Among the preferred hydrophobe-containing initiators are lauroyl and stearoyl peroxide. Many other initiators of this type are, of course, also acceptable. An important criterion, however, in the selection of the initiator, especially when the hydrophobe is introduced solely via the initiator, is that the functionality by which the hydrophobe is attached to the polymer chain be hydrolytically stable over the pH range of interest in the specific application. Among preferred non-hydrophobe-containing initiators are sodium, potassium, or ammonium persulfate, either alone or in the presence of suitable reducing agents. Here again, other initiators or initiating systems are also acceptable.

Desirable levels of initiator range from 0.0005 to 0.20 meq per gram of monomer and, preferably, from 0.005 to 0.05 meq per gram of monomer.

The chain transfer agents in this invention serve a dual purpose: (1) regulation of polymer molecular weight, and (2) introduction of the hydrophobe(s) necessary for the surprisingly enhanced thickening. The size of the hydrophobe in the chain transfer agent and the level of chain transfer agent used in the polymerization are important variables in determining the properties of the product polymer; for example, the larger the hydrophobe and the higher the polymer molecular weight, the more efficient the polymer as a thickening agent. Linear alkyl hydrophobes are more efficient than branched alkyl hydrophobes of the same number of carbon atoms. Depending upon the application of interest, these variables can readily be manipulated to afford polymes with widely differing thickening efficiencies and widely differing ancillary properties. Mixtures of chain transfer agents can also be employed to give polymers which perform in the same manner as physical blends of individual polymers prepared with the respective chain transfer agents. This capability further enables the formulator to finely adjust properties for a specific application.

The level of chain transfer agent can vary considerably; usages of 0.0001 to 0.5 meq of chain transfer agent per gram of acrylamide encompass the polymer molecular weights of interest. Polymers having optimum properties in coating applications are more specifically obtained with 0.005 to 0.05 meq of chain transfer agent per gram of acrylamide.

Preferred chain transfer agents are linear or branched alkyl mercaptans having 8 to 36 carbon atoms such as n-octyl mercaptan, sec-octyl mercaptan, n-nonyl mercaptan, n-decyl mercaptan, n-dodecyl mercaptan, t-dodecyl mercaptan, n-tetradecyl mercaptan, n-hexadecyl mercaptan, and n-octadecyl mercaptan. Hydrophobe-comprising chain transfer agents other than mercaptans would similarly be useful.

Finally, it is important to emphasize that the hydrophobe introduced via the chain tranfer agent must, at the pH of the application, be attached to the polymer chain by a hydrolytically stable linkage.

The polymerization reaction can be carried out by any of a number of techniques, well known to persons skilled in the art. The preferred method is solution polymerization in water or water/cosolvent mixtures. A less preferred method is precipitation polymerization in polar organic solvents such as methanol, ethanol, n-propanol, isopropanol, n-butanol, sec-butanol, isobutanol, tert-butanol, ethylene glycol monoalkyl ether wherein the alkyl is methyl, ethyl or butyl, the corresponding diethylene glycol ethers, acetone, methyl ethyl ketone, ethyl acetate, acetonitrile, dimethyl sulfoxide, N,N-dimethylformamide, tetrahydrofuran, dioxane, and the like, as well as mixtures of these solvents with or without water. It should be noted that some of the aforecited solvents function as efficient chain transfer agents and will thus effect the molecular weight of the product polymer to a considerable extent.

In the solution polymerization method, the product is obtained in the form of an aqueous solution or translucent dispersion depending upon its precise composition and the purification procedures subsequently employed. In the precipitation polymerization method, the product is recovered as a friable solid by filtration and air-drying. Other modes of polymerization, of course, are also applicable.

Methods of polymerization other than solution polymerization in water or a water-cosolvent mixture often have marked disadvantages in commercial practice. Examples of problems or difficulties which may add to the cost of a polymer in commercial practice can be found in the precipitation polymerization method. Precipitation polymerizations are generally limited to rather low solids, such as 10 to 15%, because of viscosity considerations and because of the highly exothermic nature of acrylamide polymerization. On precipitation, the product generally occludes large quantities of solvent forming a thick slurry which is quite difficult to stir. Isolation of the product requires filtration of a voluminous precipitate which generally proceeds slowly and poses handling problems. The filtered product requires extensive air drying for the release of the occluded solvent, posing a choice between long times, reduced pressures or elevated temperatures; all adding to the expense particularly in view of the possible environment hazard. The product being in solid form then requires the end user to dissolve the product in water prior to formulation.

A preferred method of polymerization utilizes water or water/cosolvent mixtures, the cosolvent being chosen from amongst tert-butanol, the most preferred, and the monobutyl ether of ethylene glycol or diethylene glycol. The level of these cosolvents may range from 0 to 50% by weight depending upon the nature and solubility characteristics of the initiator and chain transfer agent. Polymerization can either be induced thermally, the optimum reaction temperature then being determined by the initiator used, or by a redox process started at or about ambient temperature. As the polymerization is highly exothermic, provision must be made to control the temperature of the reaction mixture either by external cooling or by solvent reflux. The polymerization can employ a "one-shot" procedure wherein all of the monomer and initiator are present in the reactor at the onset of initiation, or by a gradual addition procedure wherein both monomer and initiator are slowly added to the reactor. When the "one-shot" procedure is used, it is advisable to limit the monomer content of the reactor during the process to less than 15 wt. %. Total reaction solids, however can be increased to a maximum of 20-30 wt. % by successive "one-shot" polymerizations in the reactor upon conversion of all of the preceeding monomer charge. At the end of the procedure, residual monomer is consumed with additional initiator or by any of the other well established methods.

If cosolvent is employed in the procedure, it is sometimes desirable to remove that cosolvent upon completion of the polymerization to afford the product in water alone. In such instances, tert-butanol is the preferred cosolvent since it can readily be distilled from the product in vacuo or via a steam sparge, the tert-butanol forming a very efficient azeotrope with water (88.2% tert-butanol/11.8% water, bp. 79.7° C.).

The polymers per se or their solutions are used for controlling the viscosity of polymeric latices of natural or synthetic water-insoluble polymers. It is preferred that the solutions, as prepared, be used to thicken the polymeric latices. However, the polymers can be isolated from the solutions as solid products which can be added to the polymeric latices. The solutions can be further diluted with water to lower solids content and the dilute solutions added to the latices. Also, the polymers can be dispersed in another liquid medium or dissolved in another solvent through a solvent exchange before they are added to the latices. The particular technique used will depend on the type latex to be thickened.

Illustrative polymeric latices are dispersions, emulsions, suspensoids and the like of the following polymers: acrylics, vinyl acetate homopolymers or copolymers, styrene-butadiene, carboxylated styrene-butadiene, polystyrene, polyvinyl alcohol, natural rubber, vinyl chloride homopolymers and copolymers, chloroprene, polyacrylonitrile, acrylonitrile-butadiene and butyl rubber. More particular polymers are homopolymers and copolymers of acrylonitrile with a diene like isoprene, butadiene or chloroprene; homopolymers of styrene, homopolymers and copolymers of vinyl halide resins like vinyl chloride, vinylidene chloride, with each other or acrylonitrile or vinyl esters such as vinyl acetate; vinyl acetate homopolymers and copolymers with ethylene and acrylates; copolymers of styrene and unsaturated acid anhydrides like maleic anhydrides; homopolymers and copolymers of acrylic and methacrylic acid and their esters and derivatives; polybutadiene; polyisoprene; ethylene-propylene copolymers; olefinic resins like polyethylene, polypropylene; polyvinyl alcohol; carboxylated natural and synthetic latices and similar polymeric materials. Acrylic polymer latices are preferred. An amount of thickener sufficient to give a thickening effect is used. Generally, the concentration of thickener will be between 0.1 and 15% by weight of the solids, preferably between 1 and 10%.

The thickener of the invention is particularly useful in improving the aqueous polymeric latices and latex paints, particularly those paints described in U.S. Pat. No. 2,795,564 issued June 11, 1957 to Conn et al. and U.S. Pat. No. 3,356,627 issued Dec. 5, 1967 to Scott. The disclosures of these patents with respect to particularly useful acrylic polymeric dispersions are hereby incorporated by reference.

In preparing coating compositions, particularly paints, pigments as well as other conventional paint ingredients can be added to the coating compositions of the invention. Conventional pigments can be used either alone or in combination. Illustrative are rutile titanium dioxide, anatase titanium dioxide, carbon black, lamp black, finely divided kaolin clays, chrome yellow, chrome green, black iron oxide, "Monastral" green pigment, "Monastral" blue pigment, "Dalamar" yellow pigment, lithopone and the like. These pigments can be extended with conventional extenders such as diatomaceous silica, calcium carbonate, barium sulfate, talc, various clays, mica and the like.

Other conventional adjuncts can also be added to the coating compositions. For example, glycols such as ethylene glycol or propylene glycol can be added to paints at concentrations of up to 30% by weight, to increase their wet-edge time and to further improve their lapping characteristics. Defoamers, pigment dispersants, microbiocides, surfactants, and other thickeners and the like can be used in the usual amounts.

Latex paints containing the acrylamide polymers of this invention are superior to those containing hydroxyethylcellulose, the most widely used of current thickeners, in providing a more Newtonian, less pseudoplastic balance of low-shear (Stormer) to high-shear (ICI) viscosity. These polyacrylamide thickeners afford paints with higher viscosity at high shear rates which means that paint films of greater thickness or "build" can be obtained. These thicker films have increased hiding as well as increased flow and leveling. The superiority of these thickeners, compared with hydroxyethylcellulose or other thickeners, is also manifested by the much higher glosses of dry paint films derived therefrom. Another important characteristic of dry paint films containing the thickeners of this invention is their high degree of block resistance, ordinarily a difficult property to obtain in smooth glossy films of latex paints, but of great practical use because a paint film often comes in contact with other paint films in many cases, such as around windows and doors and in industrial practice where coated boards are stacked as where the top board is laid face to face with the prior board so as to expose only backs of boards to marring during transport and handling.

The amount of the instant thickener required to impart some or all of these properties varies considerably depending upon precise thickener structure, especially hydrophobe size, and thickener molecular weight. In general, however, the usage levels range up to 50 lb. per 100 gallons of latex paint with preferred amounts ranging from 2 to 25 lb. per 100 gallons of latex paint, or more preferred 5 to 20 lbs.

Block resistance had been a major deficiency in semi-gloss and gloss latex paints. The polymers of this invention can be used as block improvement additives while relying on other thickeners such as hydroxyethylcellulose or acrylic thickeners to provide a viscosity base. Not only are glossy, block resistant films achieved with our polymers, but also paints with improved Stormer (expressed in Krebs units) and ICI viscosity balances (i.e., more Newtonian, less pseudoplastic) and comparable of better flow and leveling. Preferred usage levels for this application range from 1 to 25 lb. per 100 gallons of latex paint in both industrial and trade sales paints.

The blending of polymers of this invention with latex emulsions accomplishes two major objectives: (1) introduction of desirable properties at end use such as improved viscosity balances, flow, leveling, and block resistance, and (2) long term emulsion stabilization. It is of great practical importance to have an emulsion that retains its viscosity and sedimentation stability during normal storage and is also stable under freeze-thaw conditions or mechanical stress. Sedimentation stability is particularly important for latex emulsions with particle diameters greater than 0.2 micron because these latexes tend to settle at ambient temperatures under the influence of gravity. The polymers of this invention function very well in this application, enabling the preparation of stable emulsions with reasonably high solids (i.e., over 40%) without creating unreasonably high processing viscosities (i.e., over 5000 cps). Usage levels may vary from 0.25% to 10% by weight on emulsion solids, with a preferred level of 1 to 5 wt. %.

The polyacrylamide of this invention is useful in ink compositions for use in a printing apparatus operating on the so-called "ink jet printing" principle. Ink jet printing is a recent development in the art of applying identifying and decorative indicia to a base. In one system, a fluid ink is forced, under pressure, through a very small orifice in an orifice block which contains a piezoelectric crystal vibrating at high frequency (50–100,000 vibrations per second) causing the ink passing through the orifice to be broken into minute droplets equal in number to the crystal vibrations. The minute droplets are passed through a charging area where individual droplets receive an electrical charge in response to a video signal, the amplitude of the charge being dependent on the amplitude of the video signal. The droplets then pass through an electrical field of fixed intensity, causing a varied deflection of the individual droplets dependent on the intensity of the charge associated therewith, after which the deflected drops are allowed to impinge on the base medium which is to receive the decorative or informative printed indicia.

In order to operate satisfactorily in an ink jet printing system, an ink must display a consistent breakup length, drop velocity and drop charge under set machine operating conditions. To achieve these ends, the ink must meet strict requirements with regard to viscosity and resistivity, solubility and compatibility of components, stability and anti-skinning properties and must facilitate rapid cleanup of the machine components with a minimum of effort.

As a flow control adjunct and block improver, or pick release agent, the instant polyacrylamide is used, in an effective amount, in conventional fluid printing inks. Such inks often include three basic components. The first is a colorant for providing visibility of the printed indicia in contrast to the substrate surface. The colorant may be either a dye which is soluble in the ink solvent medium or a pigment which is suspended in the solvent medium. The second component is a resin or binder which remains on the substrate surface after printing and serves to adhere and bind the dye or pigment in position on the substrate surface. The third major component is the solvent which provides fluidity to the ink and carries in solution or suspension the resin and colorant. In addition to these three components which have heretofore been found in nearly all fluid printing inks, various other ingredients may be utilized, including drying, dispersing and wetting agents, plasticizers, diluents and the like. Ink jet printing inks, in addition to the three basic components above mentioned, may also desirably contain a fourth, optional component made appropriate to the ink composition by the nature of the apparatus and process of ink jet printing. This is an electrolyte, which is added so that ink droplets may be given a strong, reproducibly variable electric charge which in turn enables a controlled, reproducible deflection of the droplets by application of an electrical field to the droplet stream. Printing processes other than ink jet printing do not require inks with electrical properties capable of achieving these ends.

There are many other uses for these polymers. The polyacrylamides of this invention reduce the surface tension of aqueous solutions to a considerable extent and are thus useful as surfactants in a wide variety of applications; usage levels range from 0.01 to 20 wt. %, with the preferred levels being 0.1 to 10 wt. %. The polyacrylamides of this invention can be used as flocculants to clarify aqueous solutions of inorganic materials in the 0.001 ppm to 1000 ppm range. The polyacrylamides of this invention are adsorbed on the surface of pigment particles (e.g. titanium dioxide) and are capable of functioning as pigment dispersants; usage levels range from 0.1 to 5 wt. % on pigment solids. When added to conventional water-based ink formulations, the polyacrylamides of this invention greatly improve the transfer characteristics of the ink during printing operations; usage levels generally range from 0.1 wt. % to 20 wt. % on total ink.

In examples and elsewhere herein, parts and percentages are by weight, temperatures in degrees Celsius and measurements are made at room temperature unless otherwise indicated. The following examples are illustrations designed to assist those skilled in the art to practice the present invention but are not intended to limit the invention in any way. The various monomers and other chemicals used in the examples are commercial grade materials unless otherwise specified. Changes and variations may be made without departing from the spirit and scope of the invention as defined by the appended claims. Abbreviations for specific alkyl mercaptans are sometimes employed wherein the alkyl group is identified by the number of carbon atoms it contains thus n-dodecyl mercaptan is abbreviated as n-C12SH. Other abbreviations are:

P(AM)—polyacrylamide
EA—ethyl acrylate
MAA—methacrylic acid
AM—acrylamide
AA—acrylic acid
KU Krebs Units
ASTM—American Society for Testing Materials
HEMA—hydroxyethyl methacrylate
HEC—hydroxyethylcellulose.

EXAMPLE 1

Hydrophobic Chain Transfer Agent and Control

1A. A two-liter, four-necked flask equipped with a thermometer, heater, condenser, stirrer, and nitrogen ebulator is charged with 200 g acrylamide, 400 g tert-butanol, 1 g n-dodecyl mercaptan (n-C12SH) and 1350 g deionized water. This corresponds to 2.5 milliequivalents mercaptan per 100 g of monomer (2.5 me/100 g monomer). The mixture is stirred under nitrogen for 1.0 hour and heated to 80° C. A solution of 0.40 g ammonium persulfate in 10.0 g deionized water is then added to initiate polymerization. An immediate evolution of heat is observed with the temperature rising to 84° C., the reflux temperature, and subsiding within 5 minutes. The temperature is maintained at 80° C. for 3 hours. Residual monomer is reduced by means of an ammonium persulfate chaser system. The tert-butanol is removed by a steam sparge to produce a colorless, translucent dispersion. The weight average molecular weight, $M_w$, is 118,000.

1B. A polymer is prepared in the same manner as 1A except for the replacement of the n-C12SH by an equimolar quantity of mercaptopropionic acid (MPA), a chain transfer agent which yields a small terminal group on the polymer and not a hydrophobic terminal of the instant invention. The polyacrylamide produced is a clear, colorless solution. The $M_w$ is 118,000.

1C. A one liter four-necked flask equipped with a thermometer, heater, condenser, stirrer, nitrogen ebullator and three feed lines is charged with 128 g deionized water and 32 g tert-butanol. The mixture is sparged 1.0 hr. with nitrogen then heated to 80° C. at which point 10% of the total initiator is added to the flask. Monomer (160 g acrylamide in 321 g deionized water), 90% of the initiator (100% is 0.32 g ammonium persulfate in 50 g deionized water), and chain transfer agent (0.8 g n-C12SH, 2.5 me/100 g monomer, in 103 g tert-butanol and 4 g deionized water) are gradually fed to the flask over a period of 1.0 hr. After a 0.25 hr. hold at temperature (80° C.), residual monomer is chased with ammonium persulfate. The product (23.3% solids) has a Brookfield viscosity of 2000 cps at 80° C., and 10,000 cps at 25° C. A small loss of solvent due to the nitrogen sparge, is noted.

EXAMPLE 2

Polyacrylamide by a Process Employing a Kettle Charge

A two-liter four necked flask equipped as in Example 1C is charged with 50 g acrylamide, 332.5 g deionized water, 112.5 g tert-butanol, and 0.25 g n-C12SH (2.5 me/100 g monomer). The mixture is stirred for 1.0 hour under nitrogen and heated to 80° C. Polymerization is initiated with a solution of 0.10 g ammonium persulfate in 5.0 g deionized water. One-half hour after the onset of polymerization, a monomer solution consisting of 150 g acrylamide in 223 g deionized water and 54 g tert-butanol, a chain transfer solution consisting of 1.5 g n-C12SH (5.0 me/100 g monomer) in 5.0 g deionized water and 33.8 g tert-butanol, and an initiator solution consisting of 0.30 g ammonium persulfate in 5.0 g deionized water are simultaneously fed to the four-necked flask via the feed lines over a 1.0 hour period. The mixture is then held at 80° C. for a half hour whereupon the residual monomer is chased with ammonium persulfate. The tert-butanol is removed under vacuum (30 mm Hg/60° C.) to afford the product as a colorless, translucent, dispersion having a Brookfield viscosity of 145,000 cps. at 25.3% solids in water.

EXAMPLES 3, 4 AND 5

Mercaptan Chain Transfer Agent Variation

A series of acrylamide polymers is prepared by one of the processes described above, as noted in Table I. The acrylamide polymer employing mercaptopropionic acid as a chain transfer agent may be considered as a control. In Table I is also recorded the solution viscosity of an aqueous polyacrylamide solution as measured by a Brookfield viscometer (model LVT) employing an appropriate spindle and speed of rotation. Also tabulated are high shear (ICI) and low shear (Stormer) viscosities obtained on a paint formulation employing the acrylamide polymer of the given example at the level tabulated. The paint formulation is Formulation A given in Example 10 below.

It is clear that the polyacrylamide made employing MPA as the chain transfer agent produces an aqueous solution having a much lower viscosity than any of the others except for the sample employing n-C5SH. The Stormer viscosity and the ICI viscosity of the paint made with the n-C5SH chain transfered polyacrylamide is significantly lower than the others. Inspection of the data for examples 4A and 4B shows that the use of a peroxide comprising a large alkyl group, as initiator, further enhances the viscosity achieved in an aqueous solution of polyacrylamide made therefrom. The series of Example 5 polymers indicate that an increasing molar ratio of n-C18SH to n-C12SH increases the aqueous solution viscosity of the polyacrylamide produced therefrom. All of the polyacrylamide samples are prepared by the process of Example 1A except those of Examples 1B, 1C and 2.

EXAMPLE 6

Low Shear Viscosity of Aqueous Solutions

Employing the process of example 1A, polyacrylamide materials are prepared using 2.47 milliequivalents of n-C12SH/100 g acrylamide for example 6A, the same number of equivalents of n-C18SH for example 6B and the same number of equivalents of 3-MPA for example 6C. Solutions of the polyacrylamide materials are prepared and the viscosities measured on a Brookfield Model LVT viscometer at 25° C. The results are given, in centipoise, in Table II below. Measurements of viscosities below 8 centipoise are made using the UL adapter and a speed of 60 RPM. Numbers in parenthesis after the viscosity are the standard deviation for those cases in which multiple measurements were made. The table also contains values of the specific viscosity divided by the concentration. The specific viscosity is the fractional increase in viscosity caused by the presence of the polymer, i.e., the solution viscosity minus the viscosity of the solvent all divided by the solvent viscosity. Thus, the specific viscosity divided by the concentration gives a measure of the effectiveness of a unit weight of polymer in increasing the viscosity of the water at that concentration of polymer in water. Using the UL adapter on the Brookfield viscometer measurement of the viscosity of the water used gives the value 1.00.

It is clear from the data in Table II that the polymer of example 6B is more efficient than that of example 6A which in turn is more efficient than that of example 6C in increasing viscosity of the water. At 0.01 g/100 ml of water the P(AM) of example 6C has an immeasurably small effect on the viscosity of the water whereas the other two P(AM) polymers produce a significant increase in the water viscosity. At 0.05 g/100 ml the polymer of example 6A has produced 2.5 times the viscosity increment and that of example 6B has produced 7 times the viscosity increment of that of example 6C. At increasing concentrations the divergence in effectiveness becomes still greater so that at 10 g/100 ml the polymer of example 6A is over 17 times more efficient and that of 6B is over 8,000 times more efficient than the control, example 6C.

TABLE I

| | Mercaptan | | Solution | | Paint | | |
|---|---|---|---|---|---|---|---|
| Example | Type | Amount mmole/100 g | % T.S. | Visc. | Polymer lbs/100 gal | Stormer K.U. | ICI poise |
| 1A | n-C12SH | 2.5 | 12.3 | 1,300 | 18.5 | 83 | 2.01 |
| 1B | MPA | 2.5 | 16.9 | 90 | — | — | — |
| 1C | n-C12SH | 2.5 | 23.3 | 10,000 | 18.5 | 69 | 1.80 |
| 2 | n-C12SH | 2.5/5.0 | 25.3 | 145,000 | 18.5 | 69 | 1.80 |
| 3A | n-C5SH | 2.5 | 13.1 | 100 | 18.5 | 57 | 0.30 |
| 3B | n-C12SH | 2.5 | 12.8 | 1,400 | 18.5 | 70 | 1.59 |
| 3C | n-C16SH | 2.5 | 12.9 | 60,000[2] | 18.5 | 107 | 1.76 |
| 3D | n-C18SH | 2.5 | 11.9 | 400,000[2] | 18.5 | 118 | 1.45 |
| 4A[1] | n-C12SH | 0.62 | 12.0 | 24,500 | 18.5 | 80 | 1.49 |
| 4B | n-C12SH | 0.62 | 11.7 | 7,100 | 18.5 | 70 | 1.49 |
| 5A | n-C12SH | 2.5 | 12.3 | 1,300 | 15.8 | 67 | 1.40 |
| 5B | n-C12SH | 1.88 | 12.4 | 4,800 | 15.8 | — | — |
| | n-C18SH | 0.62 | | | | | |
| 5C | n-C12SH | 1.25 | 12.5 | 15,000 | 15.8 | 73 | 1.40 |
| | n-C18SH | 1.25 | | | | | |
| 5D | n-C12SH | 0.62 | 13.2 | 55,000[2] | 15.8 | 84 | 1.30 |
| | n-C18SH | 1.88 | | | | | |
| 5E | n-C18SH | 2.5 | 11.2 | 400,000[2] | 15.8 | 96 | 1.17 |

[1] 0.35 wt % (0.88 mmole/100 g monomers) lauryl peroxide used in place of the same molar amount of ammonium persulfate.
[2] Fractures under shear stress.

EXAMPLE 7

Dispersant for Pigments for Ink-Jet Printing

A pigment dispersion is prepared by grinding a premixture of carbon black (12 wt. %, Elftex$^R$ 8, Columbia Carbon Co.), the polymer of Example 2 (4.2 wt. % solids/ solids), and water (83.8 wt. %) for 1.0 hour on a pebble mill. This dispersion has an estimated Hegman grade "over 7" as judged by microscopic examination at 500 power.

The pigment dispersion is formulated into a printing ink by mixing 19.2 wt. % dispersion, 5.0 wt. % acrylic emulsion binder, Emulsion E-1610 (Rohm and Haas Co.), 46% solids in water, and 75.8% water. The final ink contains 2.3% carbon black, 0.805% polymer (dispersant) of example 2, and 2.3% acrylic binder solids in water.

This ink has excellent stability. After aging 2 weeks at 60° C., the particle size distribution is unchanged as measured by a Coulter Counter. There are essentially no particles larger than about 4 microns either before or after aging. A similar ink prepared with a conventional ionic dispersant, the sodium salt of a condensed naphthalenesulfonic acid, also exhibits excellent stability.

TABLE II

| Conc. g/100 ml | Example 6A | | | Example 6B | | | Example 6C | | |
|---|---|---|---|---|---|---|---|---|---|
| | Visc. (cps) | | Sp. Visc. Conc. | Visc. (cps) | | Sp. Visc. Conc. | Visc. (cps) | | Sp. Visc. Conc. |
| 15.0 | 2,950 | | 197 | — | | — | 66.5 | | 4.37 |
| 10.0 | 434 | (+21) | 43.3 | 216,000 | | 21,599 | 24.9 | | 2.39 |
| 7.5 | 118.5 | (±12) | 15.7 | 27,500 | | 3,666 | 11.3 | (±1.3) | 1.37 |
| 5.0 | 31.4 | (±1.6) | 6.08 | 8,190 | | 1,638 | 5.3 | | 0.86 |
| 3.0 | 8.8 | (±0.9) | 2.6 | 1,255 | (±78) | 418 | 2.86 | | 0.62 |
| 1.5 | 2.95 | | 1.3 | 69.7 | (±3.6) | 45.8 | 1.72 | | 0.51 |
| 1.0 | 2.11 | | 1.11 | 17.5 | | 16.5 | 1.46 | | 0.46 |
| 0.5 | 1.52 | | 1.04 | 5.2 | (±1.6) | 8.4 | 1.21 | | 0.42 |
| 0.1 | 1.07 | | 0.70 | 1.27 | | 2.7 | 1.06 | | 0.60 |
| 0.05 | 1.05 | (±0) | 1.00 | 1.14 | (±0.01) | 2.8 | 1.02 | | 0.40 |
| 0.01 | 1.025 | (±0.007) | 2.5 | 1.03 | (±0) | 3.0 | 1.00 | | 0 |

The weight average molecular weight of Example 6A P(AM) is 183,000, that of Example 6C is 118,00, as determined by laser light scattering.

In applications where an electrically conductive ink is required, ionic dispersants are often unsuitable. In these instances it is believed the conductivity is high enough to overcome the stabilizing effects of the electrical double layer associated with the dispersant. With regard to the inks of this example, that prepared with the naphthalenesulfonate salt becomes unstable at an ion concentration equivalent to a conductivity over about 2000 mho/cm whereas the ink employing the nonionic polyacrylamide of this invention, as its dispersant, is stable to about 10,000 mho/cm. It is clear that the nonionic polyacrylamide of this invention is an effective dispersant at the required high electrolyte concentration; this property is of great advantage in formulating inks for ink jet printing.

EXAMPLE 8

Acrylamide-Acrylic Acid Copolymers

The effect of pH on the viscosity of aqueous solutions of acrylamide homopolymers and acrylic acid/acrylamide copolymers of this invention, prepared by the process of Example 1A, is contrasted with that of an ethyl acrylate/methacrylic acid copolymer made by an emulsion process employing n-dodecyl mercaptan chain transfer agent. The results in Table III show that the viscosity of the ethyl acrylate/methacrylic acid copolymer solution undergoes a dramatic drop when the pH is lowered to the acid region. The viscosity of the homopolymer acrylamide materials of this invention is seen to be very insensitive to pH. The viscosity of the acrylamide/acrylic acid copolymers of this invention is seen to increase as the pH drops. This viscosity increase is a surprising result for an acid containing polymer; the expectation being that as the pH drops the polymer becomes less ionized, shrinks and thus results in a lower solution viscosity.

TALBE III

| Ex. | Polymer Composition | Mercaptan[2] me/100 g | Solution | | |
|---|---|---|---|---|---|
| | | | % Polymer | pH | Visc.[1] |
| 8A | 60 EA/40 MAA | 1.49 | 15 | 9.2 | 1338 |
| 8G | 60 EA/40 MAA | 1.49 | 15 | 2.5 | 4 |
| 8E | 100 AM | 2.48 | 17 | 9.0 | 850 |
| 8K | 100 AM | 2.48 | 17 | 2.8 | 960 |
| 8F | 100 AM | 2.48 | 18 | 9.0 | 5140 |
| 8L | 100 AM | 2.48 | 18 | 3.8 | 5090 |
| 8B | 95 AM/5 AA | 2.48 | 14 | 9.2 | 1728 |
| 8H | 95 AM/5 AA | 2.48 | 14 | 3.4 | 2430 |
| 8C | 90 AM/10 AA | 2.48 | 15 | 10.0 | 1464 |
| 8I | 90 AM/10 AA | 2.8 | 15 | 3.3 | 2710 |
| 8D | 60 AM/40 AA | 2.8 | 15 | 9.2 | 820 |
| 8J | 60 AM/40 AA | 2.8 | 15 | 4.1 | 950 |

[1]Equilibrated (24 hr.) viscosities at spindle No. 3 and 60 rpm measured at 76° F. (50% RH) on Brookfield Model LVT.
[2]All n-C12SH except 8E and 8K which use n-C10SH.

EXAMPLE 9

Paint Employing Prior Art Polyacrylamide

A series of Formulation A paints are prepared with American Cyanamid low molecular weight (ca. 200,000) acrylamide based polymers: Cyanamer$^R$ A-370, a high carboxylate polymer; Cyanamer P-26, a low carboxylate polymer; and Cyanamer P-35 a "modified" polymer recommended as a dispersant and antiprecipitant. A corresponding paint thickened with Cyanamer P-250, a polyacrylamide homopolymer reported to have a molecular weight of about 5 to 6 million, is also prepared. The test results are in Table IV A below, with that of a polymer of Example 1A. All use 18.5 lbs acrylamide polymer/100 gal. paint which corresponds to 4% by weight based on the water present. None of the paints thickened with the prior art polymers has the balance of rheology, flow, film build (ICI viscosity), block resistance and gloss of the paint prepared using the polymer of Example 1A. Particularly noteworthy is the high gloss, block and flow in the paint utilizing the polyacrylamide of the instant invention.

TABLE IV.A

| Ex. | Acrylamide Polymer | Viscosity Stormer (KU) | Viscosity ICI (Poise) | Gloss 60° | Gloss 20° | Flow Level | Block Resist. 120° F. | Block Resist. 140° F. |
|---|---|---|---|---|---|---|---|---|
| 9A | Cyanamer P250 | 141+ | 5+ | 47 | 6 | 0 | 8 | 8 |
| 9B | Example 1A | 72 | 1.8 | 87 | 46 | 10 | 8 | 6 |
| 9C | Cyanamer A370 | 99 | 1.5 | 47 | 6 | 0 | 10 | 9 |
| 9D | Cyanamer P26 | 85 | 0.8 | 37 | 4 | 1 | 8 | 5 |
| 9E | Cyanamer P35 | 55 | 0.21 | 35 | 4 | 10 | 10 | 9 |

Formulation A

| Material | lbs/100 gallons |
|---|---|
| Grind | |
| Dispersant (hydroxyethyl methacrylate-methacrylic acid copolymer) | 7.0 |
| Defoamer (Foamaster ® VL, Diamond Shamrock) | 2.0 |
| Propylene Glycol | 40.0 |
| Ethylene Glycol | 20.0 |
| Titanium Dioxide (Zopaque ® RCl-9 rutile, Glidden-Durkee, Div. SCM) | 214.7 |
| Let Down | |
| Water | 100.0 |
| Acrylic Polymer Emulsion, 60.5% solids, (Rhoplex ® AC-996 Rohm and Haas Co.) | 436.0 |
| Premix | |
| Coalescent (Texanol TM i.e. 2,2,4-trimethylpentanediol-1,3, monoisobutyrate, Eastman Chemicals) | 11.0 |
| Preservative (Super Ad-It, Tenneco Chemicals) | 1.0 |
| Defoamer (Foamaster VL) | 2.0 |
| Water | 30.0 |
| Modifier (Thickener-Adsorbent) Solution | |
| As chosen aqueous, conc. adjusted to usage | 173.4 |
| Total | 1037.1 |
| Pigment Volume Concentration: | 18.5% |
| Volume Solids: | 34.0% |

In this and other paint examples, the properties recorded include the following:

Stormer viscosity, expressed in Krebs Units (KU), is a low shear viscosity, measured at shear rate ca. $10^{-1}$ sec$^{-1}$. It is desired that the room temperature Stormer viscosity of paint be between 65 and 120 KU with 70 to 110 being preferred.

High shear (ICI) viscosity is measured by an ICI Cone and Plate Viscometer (Research Equipment Ltd., London) operated at a shear rate of ca. 10,000 sec.$^{-1}$ to simulate the shear applied to paint during brushing. Generally, as ICI viscosity increases, film thickness ("build") also increases. Good film build results in increased hiding power for the paint and also contributes to improved flow and leveling. It is desired the ICI viscosity of paint, at room temperature, be between 0.5 and 3 poise with 0.8 to 2.5 poise being preferred.

Gloss, at 60° and 20°, is determined by instrumental measurement (ASTM D 523) on films dried 48 hrs. after brushout on a Leneta Form 12H Spreading Rate Chart (Leneta Co. Ho-Ho-Kus, N.J. 07423).

Flow and leveling are determined by a visual examination of brush marks on a Leneta Form 12H Spreading Rate Chart. Ratings are on a 0–10 scale where 10 is exceptionally superior flow and leveling and 0 represents totally unacceptable flow and leveling.

Block resistance is determined by a "tack" rating on conditioned films cast with a 3 mil opening Bird drawdown applicator on a Leneta Form 5C chart. The films are dried at 77° F. (25° C.), 50% relative humidity for one week. Two 1½ inch square (3.8×3.8 cm) pieces cut out of the chart are then placed in a 120° F. or 140° F. oven with the film surfaces face-to-face under pressure under a No. 8 rubber stopper (3.2 cm. dia.) topped with a 1 kg, temperature equilibrated, weight. After 30 minutes, the films are removed from the oven and allowed to cool at ambient temperature over a period of 15 minutes. The film sections are then separated with a slow, steady force and rated for the amount of observed tack where 10 is exceptionally little tack ("tack-free") and 0 is unacceptable tack resulting in a complete seal of the film surfaces.

EXAMPLE 10

Acrylamide-Hydroxyethyl Methacrylate Copolymers

A series of copolymers of acrylamide (AM) and hydroxyethyl methacrylate (HEMA) are prepared as described in example 1A using 0.50 wt. % n-C12SH (2.5 me/100 g) on total monomer as chain transfer agent. The copolymers are used as modifiers in Formulation A paints and are tested as described in Example 9. The data are in Table IV B.

TABLE IV.B

Copolymer Modifier in Paint (18.5 lbs./100 gal paint, i.e., 4 wt % on water)

| | Modifier | | | Paint Properties | | | | | | |
|---|---|---|---|---|---|---|---|---|---|---|
| | | Aq. Vis. | | Viscosity | | Gloss | | | Block Resist. | |
| Ex. | Polymer Composition | % Solids | cps | Stormer KU | I.C.I. (Poises) | B.O.[1] 60°/20° | D.D.[1] 60°/20° | Flow | 120° F. | 140° F. |
| 10A | 100 AM | 11.4 | 980 | 70 | 2.02 | 83/51 | 82/51 | 9 | 9 | 8 |
| 10B | 95 AM/5 HEMA | 11.6 | 950 | 72 | 2.08 | 82/50 | 81/49 | 10 | 8 | 7 |
| 10C | 90 AM/10 HEMA | 11.5 | 760 | 81 | 2.28 | 78/50 | 81/50 | 10 | 8 | 7 |
| 10D | 80 AM/20 HEMA | 11.9 | 565 | 80 | 2.10 | 79/47 | 80/48 | 9 | 9 | 8+ |

Notes:
[1] B.O. = brushout, i.e., paint applied to chart by brushing
D.D. = drawdown, i.e., paint applied to chart by drawdown bar.

EXAMPLE 11

Paints Using Flow Modifiers Varied in Terminal Groups

Acrylamide homopolymers and copolymers are synthesized with various hydrophobic mercaptan chain transfer agents using the procedure of Example 1A. These acrylamide polymers, at ca. 12% solids in water, are used in Formulation A (Example 9 above). Included for purposes of comparison are controls, in Formulation A; Example 11J is thickened with hydroxyethylcellulose (Natrosol 250 MR, a product of Hercules, Inc.) and Example 11G is thickened with a polyacrylamide having a small mercaptan residue hydrophobe.

Table V gives the properties of paints containing the thickeners. It is clear, from these data, that the glosses, block resistance, and flow and leveling of the paint films and paints prepared with acrylamide polymers of this invention are surprisingly superior to the corresponding properties of the controls. It is a hallmark of this invention that the subject polyacrylamide, although a comparatively small component, is critical in producing a wet paint which exhibits good flow and leveling and a paint film having a combination of high gloss and block resistance. Based on the water in Formulation A, 13.2 and 18.5 lbs. of the modifier per 100 gal. of paint corresponds to aqueous concentrations of 2.8% and 4% respectively.

TABLE V (a)

Paint Properties - 120° F. Block Resistance

| | Mercaptan | | | Viscosities | | Gloss | | Flow/ | Block Resistance |
|---|---|---|---|---|---|---|---|---|---|
| Example | Type | Amount me/100 g | Level lb/ 100 gal | Stormer (Ku) | ICI (poise) | 60° | 20° | Leveling | 120° F. |
| 11A1 | n-C18 | 2.5 | 13.2 | 89 | 0.90 | 70 | 24 | 8 | 6 |
| 11A2 | n-C18 | 2.5 | 18.5 | 118 | 1.45 | 77 | 32 | 8 | 7 |
| 11C1 | Note 1 | | 13.2 | 68 | 1.12 | 75 | 32 | 10 | 6 |
| 11C2 | Note 1 | | 18.5 | 83 | 1.72 | 78 | 37 | 10 | 7 |
| 11D1 | n-C16 | 2.5 | 13.2 | 87 | 1.13 | 70 | 19 | 10 | 6 |
| 11D2 | n-C16 | 2.5 | 18.5 | 107 | 1.76 | 78 | 34 | 8 | 7 |
| 11E | n-C14 | 2.5 | 18.5 | 90 | 2.30 | 87 | 39 | 10 | 7 |
| 11F | n-C12 | 2.5 | 18.5 | 72 | 1.73 | 79 | 41 | 10 | 7 |
| 11G | n-C5 | 2.5 | 18.5 | 57 | 0.30 | — | — | — | 3 |
| 11J | See Text | | 5.7 | 83 | 0.46 | 20 | 2 | 5 | 3 |

Note 1
Example 11C polyacrylamide is made using 1.25 me/100 g of each of n-C18SH and n-C12SH.

TABLE V (b)

Paint Properties - 140° F. Block Resistance

| | Mercaptan | | | Viscosities | | Gloss | | Flow/ | Block Resistance |
|---|---|---|---|---|---|---|---|---|---|
| Example | Type | Amount me/100 g | Level lb/ 100 gal | Stormer (Ku) | ICI (poise) | 60° | 20° | Leveling | 140° F. |
| 11K | n-C12 | 1.5 | 13.2 | 71 | 1.30 | 75 | 35 | 9 | 0 |
| 11L | n-C5 | 2.5 | 18.5 | 55 | 0.42 | 11 | 2 | 10 | 0 |
| 11M | n-C6 | 2.5 | 18.5 | 54 | 0.38 | 20 | 3 | 10 | 0 |
| 11N | n-C8 | 2.5 | 18.5 | 54 | 0.58 | 84 | 52 | 10 | 1 |
| 11O | n-C10 | 2.5 | 18.5 | 58 | 1.00 | 86 | 57 | 10 | 5 |
| 11P | n-C12 | 2.5 | 18.5 | 72 | 1.82 | 88 | 63 | 10 | 6 |
| 11Q | n-C14 | 2.5 | 18.5 | 90 | 2.30 | 87 | 39 | 10 | 5 |
| 11R | n-C16 | 2.5 | 18.5 | 112 | 2.09 | 92 | 61 | 9 | 6 |
| 11S | n-C18 | 2.5 | 18.5 | 134 | 1.73 | 87 | 44 | 8 | 5 |

EXAMPLE 12

Block Resistance Enhancement

Acrylic latex paints are prepared according to Formulation A, defined in Example 9, and Formulation B, defined below, In this example, Formulation A paints are thickened with 13.2 lbs. per 100 gallons of latex paint of an anionic acrylic thickener having an acid number of 74.4, disclosed in U.S. Pat. No. 4,151,144, herein incorporated by reference. Formulation B is thickened with 1.8 lbs. of hydroxyethylcellulose (Natrosol ®250 MR, Hercules, Inc.) per 100 gallons of latex paint. Added to these formulations are varying amounts of the flow modifier/block improver of Example 1A covering a range up to about 1.12% by weight of water in the formulation. Paint films are evaluated as described in Example 9; results are summarized in Table VI. These data show that the adsorbent polymer of this invention remarkably improves the block resistance of films.

| Formulation B | |
|---|---|
| Material | lbs/100 gallons |
| Grind | |
| Dispersant (As in Formulation A, supra) | 7.7 |
| Defoamer (Nopco NDW, Diamond Shamrock) | 2.0 |
| Propylene Glycol | 69.8 |
| Titanium Dioxide (Zopaque RCl-9, rutile, Glidden-Durkee, Div. SCM) | 269.6 |
| Let Down | |
| Propylene Glycol | 47.8 |
| Acrylic Polymer Emulsion, 46% solids, (Rhoplex ® AC-490, Rohm and Haas Co.) | 555.9 |
| Premix | |
| Coalescent (Texanol, Eastman Chemical Products) | 15.7 |
| Preservative (Super Ad-It, Tenneco Chemicals) | 1.0 |
| Defoamer (Nopco NDW) | 2.0 |
| Wetting Agent (dioctyl sodium sulfosuccinate) | 2.0 |
| Water | 15.2 |
| Thickener Solution (See Table VI) | 83.5 |
| Total | 1073.1 |
| Pigment Volume Concentration: 22.8% | |
| Volume Solids: 34.5% | | on a styrene/acrylic polymer, are blended with flow modifying adsorbent polymers of this invention used as emulsion stabilizers; these stabilizers are acrylamide homopolymers prepared with dodecyl mercaptan and octadecyl mercaptan. The stability of these emulsions to heat aging, centrifugation, freeze/thaw cycling, and mechanical stress is determined. Results are summarized in Table VII.

EXAMPLE 14

Ink Rheology Improvement

Two polymer flow modifiers of this invention (Examples 5B and 5D) are added to a standard aqueous test ink formulation consisting of 2 parts pigment (BT 4270), 1 part aqueous colloidal dispersion, at 30% solids, of a base soluble, carboxyl styrene-acrylic, copolymer, and 2 parts styrenated acrylic, aqueous let-down emulsion at a total formulation solids of 41–43%. A similar ink let-down with Lucidene 361 (a product of Morton Chemical Co.), without modifying additives, is used as a control. Ink properties determined include (1) Brookfield viscosity, (2) ICI viscosity, (3) transfer from an Anilox roller (165 line), (4) heat aged stability (7 days, 60° C.), and (5) wet/dry rub resistance. The results are summarized in Table VIII. It is evident from the data that inks modified with polymers of this invention transfer surprisingly better than the commercial control. All other properties examined are comparable to those of the control.

TABLE VI

| Example | Formulation | Ex. 1A Polymer lb/100 gal | Ex. 1A Polymer wt % in water | Viscosities Stormer (Ku) | Viscosities ICI (poise) | Gloss 60° | Gloss 20° | Flow/ Leveling | Block Resistance 120° F. |
|---|---|---|---|---|---|---|---|---|---|
| 12A | A | 0 | 0 | 78 | 1.29 | 75 | 37 | 9 | 0 |
| 12B | A | 1.3 | 0.27 | 82 | 1.51 | 78 | 38 | 9 | 0 |
| 12C | A | 2.6 | 0.54 | 83 | 1.69 | 77 | 40 | 9 | 5 |
| 12D | A | 5.3 | 1.12 | 90 | 2.08 | 78 | 41 | 9 | 7 |
| 12E | B | 0 | 0 | 76 | 0.78 | 68 | 20 | 2 | 3 |
| 12F | B | 2.6 | 0.65 | 83 | 1.13 | 67 | 20 | 4 | 6 |
| 12G | B | 4.0 | 1.00 | 86 | 1.38 | 67 | 19 | 3 | 7 |

EXAMPLE 13

Polymer Emulsion Stabilization

Two test emulsions with particle diameters of 0.35 micron, one based on an acrylic polymer and the other

TABLE VII

| Ex. | Emul.[1] | Stabilizer[2] | Initial[3] Viscosity Low Shear | Initial[3] Viscosity High Shear | Viscosity Change %[3] Low Shear | Viscosity Change %[3] High Shear | Sedimentation Layer[3] (mm) | Centrifuge Stability[4] Clear (mm) | Centrifuge Stability[4] Pack (g) | Fr./Thaw Stab.[5] | Mech. Stab.[6] |
|---|---|---|---|---|---|---|---|---|---|---|---|
| 13A | A | none | 20 | 5 | 10 | 0 | 0 | 47 | 23 | | |
| 13B | A | 1% 1A | 101 | 30 | 115 | −33 | 12 | 18 | 12 | — | — |
| 13C | A | 2% 1A | 250 | 60 | 111 | −23 | 1 | 10 | 5 | — | — |
| 13D | A | 1% 11B | 692 | 40 | 9 | 0 | 0 | 7 | 7 | Pass | Pass |
| 13E | A | 2% 11B | 2316 | 72 | 24 | 4 | 0 | 5 | 4 | — | — |
| 13F | B | none | 28 | 10 | 4 | 0 | 0 | 44 | 24 | — | — |
| 13G | B | 1% 1A | 150 | 40 | 183 | −50 | 5 | 0 | 7 | — | — |
| 13H | B | 2% 1A | 316 | 75 | 195 | −47 | 2 | 0 | 3 | — | — |
| 13I | B | 1% 11B | 850 | 55 | 10 | −27 | 1 | 5 | 5 | Pass | Pass |

TABLE VII-continued

| Ex. | Emul.[1] | Stabilizer[2] | Initial[3] Viscosity Low Shear | Initial[3] Viscosity High Shear | Viscosity Change %[3] Low Shear | Viscosity Change %[3] High Shear | Sedimen- tation Layer[3] (mm) | Centrifuge Stability[4] Clear (mm) | Centrifuge Stability[4] Pack (g) | Fr./Thaw Stab.[5] | Mech. Stab.[6] |
|---|---|---|---|---|---|---|---|---|---|---|---|
| 13J | B | 2% 11B | 3000 | 102 | 1 | −14 | 0 | 4 | 3 | Pass | Pass |

Footnotes for Table VII
[1] A is an acrylic polymer emulsion; B is a styrene/acrylic polymer emulsion; particle diameters ca 0.35 microns; emulsion solids 46.5%.
[2] Percent on emulsion solids. Stabilizer 11B is a polyacrylamide made by the process of Example 1A using 0.62 me n-C18SH/100 g AM monomer; stabilizer 1A is the polyacrylamide of Example 1A.
[3] Initial viscosity, in cps, is measured at low shear rate (0.1 sec$^{-1}$) with a Brookfield Model LVT Viscometer and at high shear rate (10,000 sec$^{-1}$) with an ICI Cone and Plate Viscometer. After heat aging the emulsions at 140° F. for 10 days, the % change in viscosity is determined and the phase separation (mm) measured on 60 g samples (54 mm depth) of the blends in 2 oz. jars.
[4] Approximately 37 g of emulsion is centrifuged for 2 hrs. in a Sorvall SS.3 Automatic Centrifuge at 10,000 rpm. (ca. 11,000 times gravity). Afterwards, the maximum clear phase separation (mm) and the weight of hard pack (g) are measured (initial height of emulsion in centrifuge tube is 82 mm).
[5] The emulsion blend is subjected to 5 cycles of freezing (5° F., −15° C. 16 hrs) and room temperature thawing (8 hrs) and rated on the basis of resultant viscosity change and gel formation; either permanent gelling or appreciable viscosity increase found by stirring is a failure.
[6] The emulsion blend is subjected to high speed mechanical stress in a Waring blender for 5 minutes and rised through a 100 mesh wire screen; the presence of gel on the screen indicates a failure.

TABLE VIII

| Ink Property | 14A (Control) | 14B | 14C | 14D |
|---|---|---|---|---|
| % Solids | 43.5 | 43.5 | 41.3 | 42.4 |
| Flow Modifier | none | none | Ex. 5D | Ex. 5B |
| Wt. % Flow Modifier | — | — | 1.0 | 0.8 |
| Brookfield Viscosity (cps) | 110 | 75 | 95 | 100 |
| ICI Viscosity (cps) | 45 | 10 | 27.5 | 30 |
| Anilox Transfer[1] | — | | + | + |
| Dry Rub[2]/ | | = | = | = |
| Wet Rub[3] | | = | = | = |

[1] The test ink and control, at essentially equal solids and viscosity, are rolled out simultaneously with an Anilox (Flexo) hand proofer (Parmco, Inc., Roselle, N.J.). A visual comparison of the color strength of the applied inks affords an indication of relative ink transfer. A "+" sign denotes that the test ink is darker than the control and thus transfers better. A "−" sign denotes that the test ink is lighter than the control and doesn't transfer as well.
[2] Test conditions: 100 rubs, 2 lbs., Sutherland machine; the "=" sign denotes that the test ink and control are comparable in rub resistance (TAPPI test RC-183/1953)
[3] Test conditions: 10 rubs by hand.

EXAMPLE 15

Varied Thickener Uses

Table IX illustrates the use of the polyacrylamide flow modifier—adsorbent of this invention, prepared with 2.5 me mercaptan per 100 g AM as in Example 1A except as noted, as a thickener in plain water, an aqueous latex and a dispersion of solids. The results show an increase in viscosity with increasing size of the alkyl group of the chain transfer mercaptan relatively independent of the molecular weight of the polyacrylamide. The data are obtained with a Brookfield Model LVT rotational viscometer using appropriate spindle and speed. The first viscosity column is that of a 10% solution of the polyacrylamide in water. The second column is that of an acrylic polymer emulsion, identified as the commercial product Rhoplex ®AC-61, containing 2% of the acrylamide polymer on emulsion polymer solids; the Rhoplex AC-61 contains 43% polymer solids in water. The third column of viscosity data is for a pigment grind, the pigment grind portion of formulation A of Example 9 above, containing 2% acrylamide polymer on pigment, diluted with water to 40% titanium dioxide solids, by weight.

TABLE IX

| Meraptan Example | Type | P(AM) MW | Brookfield Viscosity (cps) Water | Brookfield Viscosity (cps) Rhoplex AC-61 | Brookfield Viscosity (cps) Grind |
|---|---|---|---|---|---|
| 15A | n-C5SH | 40,000 | 80 | 222 | 19.0 |
| 15B | n-C6SH | 98,000 | 38 | 32 | 17.5 |
| 15C | n-C8SH | 124,000 | 60 | 108 | 17.5 |
| 15D | n-C10SH | 70,000 | 72 | 518 | 17.5 |
| 15E | n-C12SH | 118,000 | 242 | 1500 | 22.0 |
| 15F[1] | n-C14SH | | 1840 | 1100 | 34.0 |
| 15G | n-C16SH | | 12980 | 5650 | 85.0 |
| 15H | n-C18SH | | 62400 | 13600 | 317.5 |

[1] Polyacrylamide prepared by the process of Example 1C.

EXAMPLE 16

Mercaptan Level In Polyacrylamide Synthesis

Employing the polymerization procedure of Example 1A, except for variation in the level and/or identity of the mercaptan used, polyacrylamide samples are prepared and tested, at 18.5 pounds per hundred gallons, in Formulation A paints. Viscosity and gloss data obtained on these paints are in Table X. Formulation A paints are rated in gloss as follows: at 60° above 80-excellent, 70 to 80-good, 60 to 70-fair; at 20° above 30-excellent, 20 to 30-good, 10 to 20-fair.

TABLE X

Effect of Alkyl Mercaptan Level

| Example | Mercaptan Type | Mercaptan Amount me/100 g | Paint Viscosity Stormer (KU) | Paint Viscosity ICI (poise) | Gloss 60° | Gloss 20° |
|---|---|---|---|---|---|---|
| 16A | n-C12SH | 2.48 | 73 | 1.75 | 83 | 50 |
| 16B | n-C12SH | 4.95 | 71 | 1.42 | 84 | 48 |
| 16C | n-C12SH | 7.43 | 69 | 1.25 | 84 | 50 |
| 16D | n-C12SH | 9.90 | 68 | 1.18 | 83 | 47 |
| 16E | n-C12SH | 14.85 | 63 | 1.02 | 83 | 49 |
| 16F | n-C18SH | 0.031 | 70 | 1.00 | 69 | 22 |
| 16G | n-C18SH | 0.062 | 67 | 0.90 | 65 | 16 |
| 16H | n-C18SH | 0.308 | 86 | 1.43 | 75 | 32 |
| 16I | n-C18SH | 0.62 | 99 | 1.73 | 76 | 35 |
| 16J | n-C18SH | 2.48 | 134 | 1.73 | 87 | 44 |

It is clear that with polymer made using the highest n-C12SH mercaptan levels the low shear viscosity begins to fall and in the neighborhood of 14 me mercaptan/100 g monomer low shear viscosity is unsatisfactory but gloss is good. At the other end of the scale using n-C18SH 0.031 me/per 100 g furnishes a polyacrylamide which is still satisfactory in viscosity but only fair in gloss. A polyacrylamide prepared with 0.062 me/100 g of n-C18SH has a weight average molecular weight of 671,000 as determined by laser light scattering.

EXAMPLE 17

Modified Flat and Gloss Paints

A polyacrylamide, prepared as in Example 1A, is used to modify flat and gloss paints based on (1) a commercial latex, called "terpolymer latex" comprising vinyl acetate, acrylic ester and vinyl chloride units (Ucar ® 515, Union Carbide Corp.), (2) a latex of vinyl acetate copolymerized with a small amount of an acid monomer and (3) a vinyl acetate/acrylic ester, about 4/1 by weight, latex.

Examples 17A and 17B are flat formulations having 40% pigment volume concentration and 40% volume solids.

| Material | 17A (lbs) | 17B (lbs) |
|---|---|---|
| Water | 95.0 | 95.0 |
| Tamol ® 731 (dispersant - Rohm and Haas Co.) | 15.0 | 15.0 |
| Triton ® CF-10 (surfactant - Rohm and Haas Co.) | 2.5 | 2.5 |
| Foamaster ® VL (defoamer, Diamond Shamrock) | 1.0 | 1.0 |
| Ethylene Glycol | 25.0 | 25.0 |
| Titanium Dioxide (R-960, DuPont) | 250.0 | 250.0 |
| Talc (IT-3X, Vanderbilt Corp.) | 203.7 | 203.7 |
| Letdown | | |
| Ucar ® 515 (53% solids) | 460.0 | 460.0 |
| Foamaster ® LV (defoamer) | 2.0 | 2.0 |
| 2,2,4-trimethylpentanediol-1,3-monoisobutyrate | 11.5 | 11.5 |
| Super-Ad-It ® (preservative Tenneco Chemicals) | 9.0 | 9.0 |
| Propylene Glycol | 35.0 | 35.0 |
| Water | 113.2 | 99.6 |
| Hydroxyethylcellulose (Hercules Natrasol MHR) - Dry lbs. | 1.8 | — |
| Polyacrylamide (Example 14) | — | 15.4 |
| Total | 1224.7 | 1224.7 |

These flat formulations, having a Stormer viscosity of 77 KU, are elevated with respect to flow and film build. Example 17A, thickened with HEC, has a flow rating of 4 (Scale: 0–10, with 10=best) and an ICI viscosity of 0.9 poise. Example 17B, thickened with a polymer of this invention, has a flow rating of 10— and an ICI viscosity of 2.1 poise, thus exhibiting superior flow and film build.

Examples 17C and 17D are gloss formulations having 18.5% pigment volume concentration and 34% volume solids.

| Material | 17C (lbs) | 17D (lbs) |
|---|---|---|
| Tamol SG-1 (dispersant, 35% solids, Rohm and Haas Co.) | 7.0 | 7.0 |
| Foamaster VL (defoamer) | 1.0 | 1.0 |
| Propylene Glycol | 55.0 | 55.0 |
| Titanium Dioxide (R-900 DuPont) | 208.9 | 208.9 |
| Letdown | | |
| Water | 215.0 | 199.5 |
| Ucar 515 (53% solids) | 533.0 | 533.0 |
| 2,2,4-trimethylpentanediol-1,3 monoisobutyrate | 13.4 | 13.4 |
| Super-Ad-It (preservative) | 1.0 | 1.0 |
| Foamaster VL (defoamer) | 3.0 | 3.0 |
| Hydroxyethylcellulose (Hercules Natrasol 250 MR) | 3.3 | 1.5 |
| Polyacrylamide (Example 1A) | — | 17.0 |
| Total | 1040.6 | 1040.3 |

These formulations are evaluated for gloss, flow and film build. Results are summarized in the following table. It is apparent from the data that the polyacrylamide of this invention results in a paint which is superior in all of these properties.

| Ex. | Stormer Visc. (KU) | ICI Visc. (Poise) | Flow Rating (0–10 best) | Film Build (g/ft$^2$) | Gloss 60°/20° |
|---|---|---|---|---|---|
| 17C | 73 | 0.6 | 4+ | 6.2 | 79/27 |
| 17D | 78 | 1.5 | 9 | 8.2 | 82/37 |

In Examples 17E and 17F, a polyacrylamide, made as in Example 1A, is evaluated in a paint, based on a vinyl acetate emulsion (51.3% solids), for gloss, flow, and film build. Results are summarized in the following tables along with data obtained on an HEC-thickened control.

| Component | 17E (lbs) | 17F (lbs) |
|---|---|---|
| Tamol 731 (dispersant, 25% solids, Rohm and Haas Co.) | 10.8 | 10.8 |
| Nopco NDW (defoamer) | 2.0 | 2.0 |
| Propylene Glycol | 59.8 | 59.8 |
| TiO$_2$ (RCl-9) | 296.6 | 296.6 |
| Letdown | | |
| Propylene Glycol | 57.8 | 57.8 |
| Vinyl acetate emulsion (51.3% Solids) | 513.2 | 513.2 |
| Premix | | |
| Super-Ad-It | 1.0 | 1.0 |
| Water | 15.2 | 15.2 |
| 2,2,4-trimethylpentanediol-1,3 monoisobutyrate | 15.7 | 15.7 |
| Dibutyl phthalate | 6.8 | 6.8 |
| Triton GR-7 (surfactant, Rohm and Haas Co.) | 2.0 | 2.0 |
| Nopco NDW | 2.9 | 2.9 |
| Hydroxyethylcellulose (Natrasol 250 MR 3.2% solids in water) | 47.6 | — |
| Polyacrylamide (Ex. 1) (15% solids in water) | — | 122.9 |
| Water | 66.0 | 8.2 |
| Total | 1097.4 | 1114.9 |

Pigment Volume Concentration: 22.8%
Vol. Solids: 34.5%

| Ex. | pH | Stormer Visc. (Ku) | ICI Visc. (Poise) | Flow Rating (0–10 best) | Gloss 60°/20° |
|---|---|---|---|---|---|
| 17E | 6.9 | 74 | 1.02 | 6 | 77/29 |
| 17F | 6.7 | 82 | 2.71 | 10 | 80/35 |

Although differing little from the HEC control in low shear viscosity, the paint using the acrylamide is much higher in high shear viscosity, gloss, and flow.

In Examples 17G and 17H a polyacrylamide made as in Example 1A, is evaluated with a copolymer emulsion (49.3% solids) comprising about 80% vinyl acetate and about 20% butyl acrylate mer units for flow, gloss and film build. Results are summarized in the following tables along with data obtained for an HEC-thickened control.

| Component | 17G (lbs) | 17H (lbs) |
|---|---|---|
| Tamol 731 (Dispersant, Rohm and Haas Co.) | 7.05 | 7.05 |
| Nopco NDW | 1.30 | 1.30 |
| Propylene Glycol | 38.99 | 38.99 |
| Titanium Dioxide (RC1-9) | 175.77 | 175.77 |
| Letdown | | |
| Acetate-acrylate Emulsion (49.3% solids) | 574.40 | 574.40 |
| 2,2,4-Trimethylpentanediol-1,3 monoisobutyrate | 16.99 | 16.99 |
| Triton GR-7 (surfactant, 64% solids, Rohm and Haas Co.) | 2.00 | 2.00 |
| Propylene Glycol | 20.87 | 20.87 |
| Hydroxyethylcellulose (Natrasol 250 MR, HEC, 2.5% solids) | 86.40 | — |
| Polyacrylamide (Ex 1) (14.1% solids in water) | — | 107.80 |
| Water | 85.65 | 64.25 |
| Total | 1009.42 | 1009.42 |

Pigment Volume Concentration: 15%
Vol. Solids: 34.0%

| Ex. | pH | Stormer Visc. (KU) | ICI Visc. (Poise) | Flow Rating (0–10 best) | Gloss 60°/20° |
|---|---|---|---|---|---|
| 17G | 7.35 | 76 | 0.35 | 0 | 75/18 |
| 17H | 7.40 | 77 | 1.30 | 8 | 73/27 |

Although differing from the HEC thickened control but little in low shear viscosity, the paint using the acrylamide thickener is much higher in high shear viscosity, low angle gloss and most particularly in flow.

EXAMPLE 18

Industrial Finish

A polyacrylamide, prepared as in Example 1A, is used to modify an industrial paint, at several levels, and hardboard coated therewith is tested for blocking as follows:

| Paint Preparation | | |
|---|---|---|
| Base Paint (45 PVC) | lbs | gal. |
| Grind | | |
| Propylene Glycol | 7.4 | 0.86 |
| Dispersant, Tamol ® 731 (25%) (Rohm and Haas Co.) | 7.0 | 0.76 |
| Surfactant, Triton ® CF-10 (Rohm and Haas Co.) | 0.7 | 0.08 |
| Defoamer, Nopco ® NXZ (Nopco Chemical Co.) | 1.4 | 0.19 |
| TiO$_2$, TiPure ® R-900 (DuPont) | 141.1 | 4.06 |
| Silica, Neosil ® A (Tammsco Inc.) | 313.6 | 14.22 |
| Water | 91.8 | 11.0 |
| Grind 15 minutes in a Cowles dispersor at high speed. | | |
| Letdown | | |
| Defoamer, Nopco ® NXZ | 1.0 | 0.13 |
| Surfactant, Triton ® GR-7M (64%) (Rohm and Haas Co.) | 0.7 | 0.08 |
| Rhoplex ® AC-1025 (42.5% solids acrylic polymer emulsion, Rohm and Haas Co.) | 500.6 | 56.31 |
| Diethylene glycol monomethyl ether } premix | 21.3 | 2.46 |
| Water } | 21.3 | 2.56 |

B. Modified Paints for Blocking Evaluations

All have viscosity of 16 seconds (#4 Ford cup), compositions are in parts by weight given in the table below:

| Example | 18A | 18B | 18C | 18D |
|---|---|---|---|---|
| Base Paint | 260 | 260 | 260 | 260 |
| P(AM) modifier, 10% | 0 | 4.91 | 14.7 | 24.6 |
| Water | 45 | 55 | 65 | 75 |
| % Modifier on Rhoplex AC-1025 (solids on solids) | 0 | 1 | 3 | 5 |
| Blocking | | | | |
| set 1 | 5E | 3.5 C | 3 B-C | 2.5 A-B |
| set 2 | 4D | 4 C-D | 3 C | 2.5 B |

Sample Preparation

Two pairs of substrate (Dekalux interior hardboard of dimensions 4"×6"×⅛") pieces are thinly, i.e., skin-coated, by applying paint with a #5 wire wound rod (WWR). Following air drying, sufficient paint is cast (WWR #36-WWR #40) onto the skin coat to yield a dry paint layer of approximately 1 mil thickness. Immediately following this coating, the samples are dried for 10 minutes in an air oven at 180° F. The samples are then conditioned in a constant temperature room (CTR) for 30 minutes (T=75° F.; RH=50%).

Blocking Tests

Following CTR conditioning, the test substrates and four Masonite exterior hardboard, Laurel X-90, pieces (4"×6"×⅜") are placed in an air oven at 120° F. for 15 minutes. The test samples are then placed against each other, coated face to coated face, with their long axes (6") at 90° to yield a contact area of 16 in.$^2$ (4"×4"). The outer uncoated faces of the test substrates are each backed by two laurel X-90 boards and the resultant stack is placed in an unheated press. Pressure (1600 lbs. force, 100 psi) is applied for 30 minutes and then released.

Blocking is then evaluated in terms of the force required to separate the samples (a numeral) and damage to the surfaces resulting from the separation (a letter) as follows:

| Separation Force (rated 0–5) |
|---|
| 0 - No sticking |
| 1 - Separated by mild shaking |
| 2 - Separated by a moderate rap |
| 3 - Must be pulled apart. |
| 4 - Very hard to pull apart |
| 5 - Extremely hard to pull apart |
| Separation Damage (rated A–E) |
| A - No damage |
| B - Damage at a few spots only (ca. 2% of area) |
| C - Damage at ca. 15% of area |
| D - Damage at ca. 30% of area |
| E - Damage at 50% of area or more. |

EXAMPLE 19

Acrylamide Copolymer Paint Rheology Modifier

A copolymer of acrylamide (80 wt. %) and N-vinyl-pyrrolidone (20 wt. %) is prepared with 0.2 wt. % ammonium persulfate and 0.5 wt. % n-dodecylmercaptan via the procedure described in Example 1A. The tert-butanol is then removed in vacuo to afford a solution of the polymer in water at 14.3% solids (Brookfield Viscosity: 400 cps). This polymer is used to prepare a flat acrylic latex paint (Example 19A) with the following formulation. A control paint (Example 19B) is thickened solely with hydroxyethylcellulose (Natrosol 250 MHR, Hercules).

|  | lbs./100 Gallons Paint | |
|---|---|---|
| Material | Example 19A | Example 19B |
| Grind | | |
| Water | 90.0 | 90.0 |
| Dispersant (Tamol 731, 25%) | 16.8 | 16.8 |
| Surfactant (Triton CF-10) | 12.4 | 12.4 |
| Defoamer (Nopco NDW) | 1.0 | 1.0 |
| Ethylene Glycol | 23.8 | 23.8 |
| Titanium Dioxide (R-960) DuPont) | 231.6 | 231.6 |
| Talc Extender (IT3X, R. T. Vanderbilt) | 188.9 | 188.9 |
| Letdown | | |
| Emulson E-1381 (61.0% solids, acrylic polymer emulsion, Rohm and Haas Co.) | 349.3 | 349.3 |
| Defoamer (Nopco NDW, Diamond Shamrock) | 1.0 | 1.0 |
| Presevative (Super-Ad-It, Tenneco) | 1.0 | 1.0 |
| Coalescent (Texanol, Eastman Chemical) | 10.7 | 10.7 |
| Propylene Glycol | 32.4 | 32.4 |
| AM/NVP Thickener Solution (14.3%) | 37.8 | — |
| HEC Thickener Solution (2.5% Natrosol 250 MHR) | 112.5 | 125.0 |
| Water | 55.3 | 80.6 |

The rheology properties obtained are summarized as follows:

| Example | Stormer Visc. (KU) | ICI Visc. (posie) | Flow/Leveling |
|---|---|---|---|
| 19A | 81 | 1.20 | 8 |
| 19B | 78 | 0.80 | 8 |

It is evident from the data that the acrylamide/N-vinylpyrrolidone copolymer of this invention markedly improves the high shear (ICI) viscosity of the paint with respect to the control.

EXAMPLE 20

Polyacrylamide Synthesis of Chujo

The polyacrylamide synthesis procedure given by Chujo, U.S. Pat. No. 3,627,820, column 3, lines 57 to 70, as his Example 3, is followed employing as the mercaptan n-C18SH, n-C16SH, n-C14SH, n-C12SH and t-C12SH. With the first three of these mercaptans, little if any polymer is obtained; with the n-C12SH a modest yield is obtained and with t-C12SH, the actual mercaptan used by Chujo, a good yield is obtained. The two polyacrylamide materials obtained with the two dodecyl mercaptans are tested at 18.5 pounds per 100 gallons in Formulation A paints. The viscosity data obtained on these paints are in the following table along with viscosity data obtained employing polyacrylamide materials of this invention. It is seen that the Chujo synthesis samples are deficient in viscosity compared with the polyacrylamides of this invention made using either higher (data from Example 16) or lower amounts of mercaptan in the polyacrylamide synthesis. The line labeled "Statistical" records values of the Stormer viscosity and ICI viscosity obtained by a statistical analysis, via curve fitting of data, on paints employing polyacrylamides of this invention synthesized in the presence of both higher and lower amounts of the n-C12SH.

|  |  | Mercaptan | | Viscosity | |
|---|---|---|---|---|---|
| Example | Synthesis | Type | Amount me/100 g | Stormer (KU) | ICI (poise) |
| 20A | Chujo | t-C12SH | 1.0 | 55 | 0.60 |
| 20B | Chujo | n-C12SH | 1.0 | 60 | 0.83 |
| 20C | Example 1A | n-C12SH | 0.62 | 68 | 1.39 |
| 16A | Example 1A | n-C12SH | 2.48 | 73 | 1.75 |
| Statistical | Example 1A | n-C12SH | 1.0 | 70 | 1.46 |

The synthesis procedure of Chujo is seen to be unsatisfactory as a general polymerization procedure employing hydrophobic mercaptans. Where successful, the polyacrylamide made by the Chujo method is a less efficient thickener.

EXAMPLE 21

Vinyl Topcoat Thickener—Block Additive

A copolymer of acrylamide (95.0 wt. %) and styrene (5.0 wt. %) is prepared according to a modification of the procedure of Example 1C using 0.5 wt. % n-C12SH, 0.2 wt. % ammonium persulfate and a solvent medium consisting of 75 wt. % deionized water and 25 wt. % t-butanol. The modification is that the styrene monomer is mixed into the chain transfer agent solution and fed into the reaction flask in that solution. Upon completion of the polymerization, the t-butanol is removed via a steam sparge to afford the product at 17.0% solids in water with a Brookfield Viscosity of 28,000 cps.

This copolymer is evaluated in a clear vinyl topcoat formulation as a rheology modifier/block improvement additive in comparison with a currently used commercial thickener. The topcoat formulation is based on a vinyl printing and finishing acrylic copolymer emulsion, Emulsion E-1691, 41.5% solids, Rohm and Haas Company, and comprises a flatting agent, a leveling agent, a surfactant, a coalescent, sodium bicarbonate and water to bring the E-1691 solids to 25% of the formulation. For Example 21a, a control, Acrysol TT-678 (Rohm and Haas Company, 60% solids) thickener is added in the amount of 2% of the formulation. Example 21b has 4.5% of the formulation added in the form of a 17.0% solids solution of a thickener of this invention being 95% acrylamide and 5% styrene.

The formulated coatings are applied to an automotive vinyl (Chrysler interior upholstery vinyl) using a number 20 wire wound rod, then dried 1.0 minute at 180° F. to give films 0.3 to 0.4 mils thick. The films are tested for block by a modified Fisher Body test, Method 31-6, modified to make the test more stringent by being run at 180° F., 1.5 psi and 24 hour duration as compared to the standard test conditions of 175° F., 0.5 psi and 30 minutes. Block is evaluated in the range from 1.0 to 5.0 (worst) with six independent evaluations being averaged. The films made from Example 21A formulation had a block rating of 5.0, which is unacceptable, whereas the films made from the Example 21B formulation had a rating of 2.7, which is acceptable.

We claim:

1. In a method of preparing a water-soluble addition polymer of acrylamide and 0–50% by weight of one or more other vinyl monomers, the improvement wherein there is employed a substantially water-insoluble molecule, having an effective hydrophobe group, as a free radical initiator, a chain transfer agent or a component of the initiator or the agent; the polymer having a weight average molecular weight greater than 10,000 and being prepared by a solution polymerization process.

2. The method of claim 1, the hydrophobe being a hydrocarbyl group comprising at least 8 carbon atoms.

3. The method of claim 2, the acrylamide polymer having a molecular weight between 50,000 and 1,000,000, the hydrocarbyl group being part of a mercaptan and having between 10 and 36 carbon atoms, and up to 10% by weight of the other vinyl monomer or monomers being hydrophobic.

4. The method of claim 3, the hydrocarbyl group being 12 to 22 carbon atoms, and the other vinyl monomer or monomers being 0 to 30% by weight selected from hydroxyethyl methacrylate, hydroxyethyl acrylate, methacrylic acid, acrylic acid and N-vinylpyrrolidone and 0 to 10% by weight selected from styrene, αmethylstyrene and vinyl toluene; and being in an atmosphere substantially free of oxygen.

5. The method of claim 4 employing a 1:1 to 20:1 ratio of water to tertiary-butanol solvent and a mercaptan chain transfer agent at 0.005 to 0.05 milliequivalents per gram of monomer.

6. The method of claim 5 the polymer being polyacrylamide.

7. A composition comprising a water solution of the addition polymer made by the method of claims 1, 2, 3, 4, 5 or 6.

8. In a multiphase composition comprising an aqueous phase and at least one other water-insoluble phase, the improvement wherein the composition comprises a water-soluble vinyl polymer of acrylamide and 0 to 50% by weight other vinyl monomers; the polymer having a weight average molecular weight greater than 10,000 and being a product of a solution polymerization process employing a fee radical initiator or a chain transfer agent; said initiator, transfer agent or a component of one of these, being substantially water-insoluble and comprising an effective hydrophobe group.

9. The composition of claim 8 comprising an emulsion polymer latex, the acrylamide polymer being 0.01% to 20% of the emulsion polymer by weight.

10. The composition of claim 9 the acrylamide polymer being 1 to 10% of the emulsion polymer by weight.

11. The composition of claim 8 additionally comprising a pigment.

12. A paint formulation comprising the composition of claim 10 and, optionally, a pigment up to 50% of the paint by volume.

13. The composition of claim 8, the hydrophobe being a hydrocarbyl group comprising at least 8 carbon atoms and the polymer being at least 0.1% by weight of water in the solution.

14. The composition of claim 13, the acrylamide polymer having a molecular weight between 50,000 and 1,000,000, the hydrocarbyl group being part of a mercaptan and having between 10 and 36 carbon atoms, and up to 10% by weight of the other vinyl monomer or monomers being hydrophobic.

15. The composition of claim 14, the hydrocarbyl group being 12 to 22 carbon atoms, and the other vinyl monomer or monomers being 0 to 30% by weight and selected from hydroxyethyl methacrylate, hydroxyethyl acrylate, methacrylic acid, acrylic acid and N-vinylpyrrolidone and 0 to 10% by weight selected from styrene, αmethylstyrene and vinyl toluene; the process being in an atmosphere substantially free of oxygen.

16. The composition of claim 15 the process employing a mercaptan chain transfer agent at 0.005 to 0.5 milliequivalents per gram of monomer.

17. The composition of claim 16, the process employing a 1:1 to 20:1 ratio of water to tertiary-butanol solvent and the polymer being polyacrylamide.

18. A method of preparing the multiphase composition of claim 8 comprising dissolving the polymer in water and associating the water phase with another phase.

19. A method of preparing the multiphase composition of claim 17 comprising dissolving the polymer in water and associating the water phase with another phase.

20. A method of preparing the multiphase composition of claim 8 comprising preparing the polymer and adding it to a multiphase system.

21. A method of preparing the multiphase composition of claim 17 comprising preparing the polymer and adding it to a multiphase system.

22. An article prepared by applying the multiphase composition of claim 8, 9, 10, 11, 12 or 17 to a substrate and drying or curing the composition.

* * * * *